United States Patent [19]

Reeve

[11] 3,873,780

[45] Mar. 25, 1975

[54] TELEPHONE SWITCHING SYSTEM

[75] Inventor: Peter Frederick Reeve, Galion, Ohio

[73] Assignee: North Electric Company, Galion, Ohio

[22] Filed: May 9, 1073

[21] Appl. No.: 358,587

[52] U.S. Cl. .............................................. 179/18 GE

[51] Int. Cl. .......................... H04m 3/00, H04q 3/42

[58] Field of Search ......... 179/18 GE, 18 GF, 18 E, 179/18 EB, 18 G, 18 H

[56] References Cited

UNITED STATES PATENTS

| | | | |
|---|---|---|---|
| 3,382,324 | 5/1968 | Shirasu et al. | 179/18 GE |
| 3,420,962 | 1/1969 | Warman | 179/18 GE |
| 3,499,123 | 3/1970 | Gee et al. | 179/18 GE |
| 3,760,117 | 9/1973 | Czarnecki et al. | 179/18 GE |

*Primary Examiner*—Thomas A. Robinson
*Attorney, Agent, or Firm*—Johnson, Dienner, Emrich & Wagner

[57] ABSTRACT

A common control telephone switching system having a first crossbar switch and associated transmission circuits for completing intra-switch connections between communication lines of the first crossbar switch; a second crossbar switch and associated transmission circuits for completing intra-switch connections between communication lines of the second crossbar switch; the system including relay transfer circuitry for enabling the previously mentioned connections and also for enabling the use of the transmission circuits for completing inter-switch connections between lines of both switches.

6 Claims, 3 Drawing Figures

TELEPHONE SWITCHING SYSTEM

BACKGROUND OF THE INVENTION

1. Field of the Invention

This invention relates to common control telephone switching systems having more than one crossbar switch.

2. Description of the Prior Art

In a telephone switching system wherein a single crossbar switch handles the traffic for a fixed number of lines, a number of transmission bridges are provided to interconnect these lines so as to have multiple simultaneous conversations. When the number of lines is increased, in order to maintain the same rate of service, additional transmission bridges must be added to the system.

This increase in the number of lines in the system can be accomplished by adding an additional crossbar switch to the system. With two crossbar switches in the system, the lines on one crossbar switch, besides being able to have access among themselves must also have access to all the lines on the other crossbar switch. Normally this is accomplished by dedicating the transmission bridges associated with each crossbar switch to either intra-switch traffic or inter-switch traffic.

The two extreme cases of such dedications are first, where all transmission bridges are dedicated to intra-switch calls, allowing for no calls between lines on different switches; and second, where all the transmission bridges are dedicated to inter-switch calls, allowing for no calls between lines on the same switch. In most switching systems neither extreme is realized but a mix of the two types of dedicated transmission bridges is used. This mix will consist of some bridges associated with each crossbar switch being dedicated to intra-switch calls, and some common bridges between the crossbar switches being dedicated to inter-switch calls. Hopefully the mix will permit a maximum usage of the bridges, but this will depend on the mix of the actual calls taking place, i.e. the number of intra-switch calls being placed vs the number of inter-switch calls being placed at the same time. Naturally this limits the capability of the total system, for if more than the maximum number of calls of one type of bridge is placed, even though bridges of the other type of call are available they cannot be used to handle that maximum traffic because of their dedicated nature. Thus, dedication of function seriously hampers maximum traffic handling.

SUMMARY OF THE INVENTION

The present invention solves the difficulty of the prior art by having a transfer relay associated with each transmission bridge. Each individual transfer relay can establish a path between two lines on its associated crossbar switch, or alternatively, can establish a path between a line on one crossbar switch, and a line on another crossbar switch.

Each transfer relay associated with one crossbar switch cooperates with another transfer relay associated with another crossbar switch. With the system being operated by a common control circuit, it is possible to arrange and rearrange the traffic patterns within the system so that similar types of calls, whether intra-switch or inter-switch, are on cooperating transfer relays, thus permitting maximum usage of the bridge circuits.

It is also possible to have one of the relays in an intra-switch position while its cooperating relay is in the inter-switch position. With this arrangement, three-way conference calls are possible.

Thus it is an object of the present invention to increase the traffic carrying capacity of a telephone switching system.

It is an additional object of the invention to have a telephone switching system with non-dedicated transmission bridges.

It is a further object of the invention to have dual usage of the transmission bridges in a telephone switching system for intra-switch traffic and inter-switch traffic.

It is still a further object of the invention to increase the number of crossbar switches and transmission bridges in a telephone switching system without providing additional transmission bridges for cross-coupling between the crossbar switches.

It is a further additional object of the invention to increase the line size of a telephone switching system without increasing the space per line or the cost per line of the system.

DESCRIPTION OF THE PREFERRED EMBODIMENT

Figure 1A:
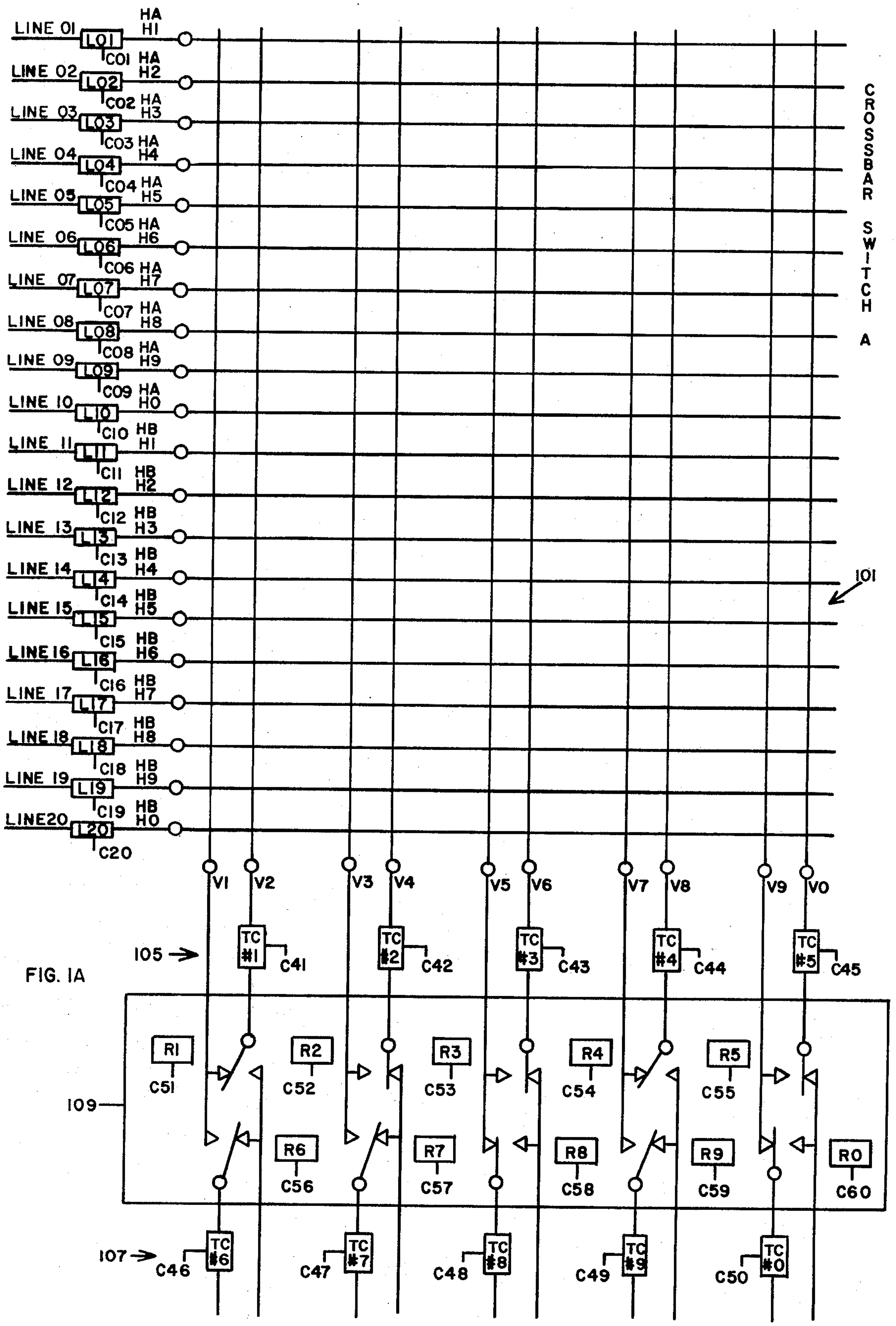
FIGS. 1A and 1B set forth a diagrammatic representation of a first and a second crossbar switch with associated transmission bridge circuits and relays.
Figure 1B:
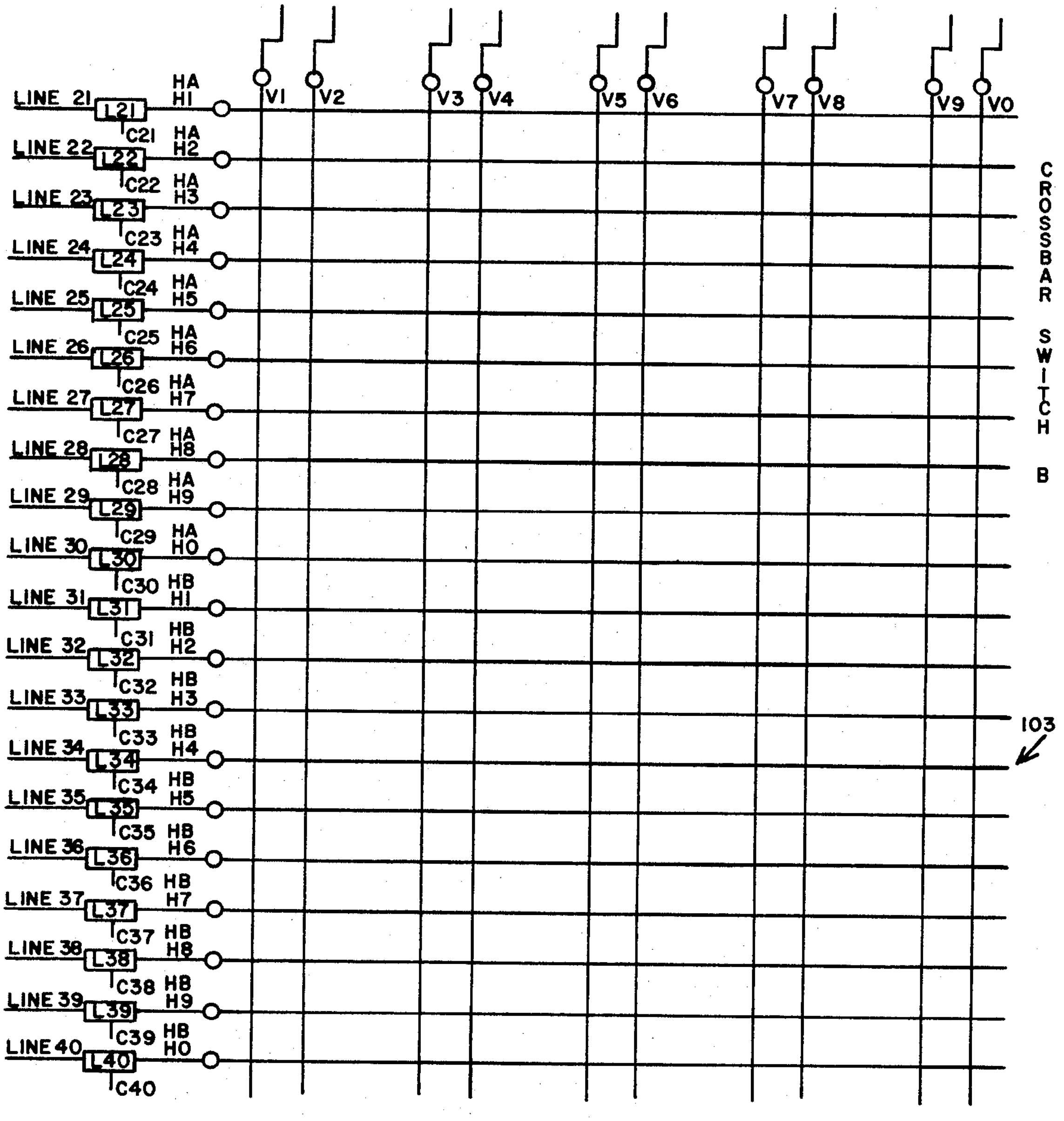
Figure 2:
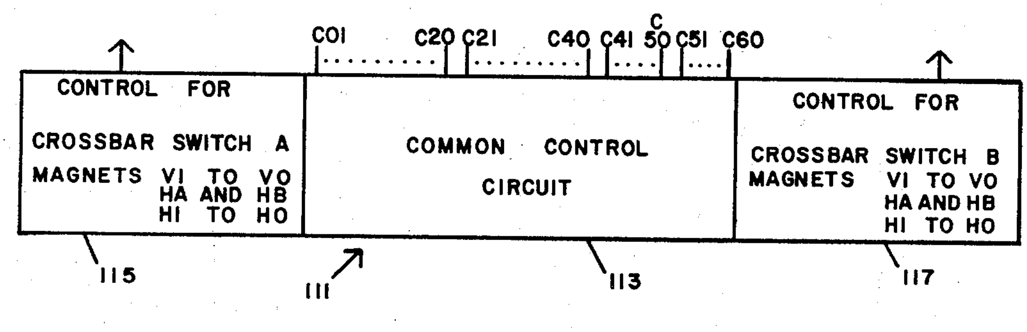
FIG. 2 is a schematic diagram of the control circuits which are used with the switches and circuits of FIGS. 1A, 1B.

FIGS. 1A and 1B together show the switching system of a small telephone switching center such as a 40 line PBX or PX. The system consists of first crossbar switch A, 101, shown in FIG. 1A, a second crossbar switch B, 103, shown in FIG. 1B, a first series of transmission bridge circuits, TC No. 1 to TC No. 5, 105, associated with crossbar switch A, a second series of transmission bridge circuits TC No. 6 to TC No. 0, 107, associated with crossbar switch B, a transfer relay circuit 109, and a common control circuit 111 having a first section 113 for controlling circuits C01–C60 of the system, a second section 115 for controlling the magnets of crossbar switch A, and a third section 117 for controlling the magnets of crossbar switch B.

Crossbar switches A and B, 101 and 103, shown in FIGS. 1A and 1B, could be of the crossbar type as shown in U.S. Pat. No. 3,007,008, issued to K. K. Spjeldnes et al., on Oct. 31, 1961, and assigned to the present assignee a feature of such crossbar switch being that the crosspoint is not released when the horizontal magnets are de-energized, but remain locked by the vertical until the vertical is released.

As shown in FIGS. 1A and 1B, lines 01 to 20 are connected to the horizontal side of the crossbar switch A by means of line circuits L01 to L20, while lines 21 to 40 are connected to the horizontal side of crossbar switch B by means of line circuits L21 to L40. In each of the crossbar switches, the first ten lines are controlled by associated horizontal magnets H1 to H0 when energized in conjunction with horizontal magnet HA. These same horizontal magnets H1 to H0, when energized in conjunction with horizontal magnet HB, control the last 10 lines in each crossbar switch.

To serve the 20 lines associated with the horizontal side of each crossbar switch, each crossbar switch has 10 verticals, which allow each crossbar switch to carry on 5 intra-switch simultaneous conversations. The individual verticals are controlled by respective associated vertical magnets V1 to V0.

Thus, to make a path through each crossbar switch three magnets must be energized; one of the horizontal magnets H1 to H0, one of the vertical magnets V1 to V0, and either horizontal magnet HA or horizontal magnet HB. All of the magnets H1 to H0, V1 to V0, HA and HB associated with crossbar switch A are operated by section 115 of common control circuit 111. All of the magnetis H1 to H0, V1 to V0, HA and HB associated with crossbar switch B are operated by section 117 of common control 111. The magnets in each crossbar switch which will in fact be energized is determined by the common control circuit 111. The individual horizontal and vertical magnets are not shown in FIGS. 1A and 1B but are indicated in the drawings. More detail of the operation of the individual crossbar switches can be obtained by referring to the above referenced patent.

Besides controlling the horizontal and vertical magnets associated with each crossbar switch, the common control circuit 111 communicates with each line through a line circuit L01 to L40 over a path C01 to C40. Each line circuit L01 to L40 acts as an interface between the individual line and the control circuit 111. Through the line circuits L01 to L40 and over the paths C01 to C40 the common control circuit 111 is able to detect line conditions such as off-hook and on-hook, establish rotary dial digit or dual tone multifrequency recognition, and place on each line via tone injection, dial tone or busy tone. Ringing current and ringback tone would be transmitted to the lines via the called and calling side respectively of the individual transmission bridge circuit TC No. 1 to TC No. 0 associated with each connection.

The main function of the transmission bridge circuits TC No. 1 to TC No. 0 is to couple AC transmissions from one side of the circuit to the other while at the same time effecting DC isolation, thus permitting instruments on either side of the circuit to have individual control over direction control, battery feed, tone control, and ring trip.

Control of the individual transmission bridge circuits TC No. 1 to TC No. 0 is provided from common control circuit 111 via the associated paths C41 to C50.

It will be noted that each transfer bridge circuit of the group 105 is directly connected to an even numbered vertical of crossbar switch A, 101, whereas each transfer bridge circuit of the group 107 is directly connected to an odd numbered vertical of crossbar switch B, 103. The reason for this alternation will be described below. At this point it is to be noted that, whereas it is normal for each transmission bridge circuit to be directly connected to the vertical associated with the party initiating the call, because control over each transmission bridge circuit resides in the common control circuit 111, the vertical could just as well be associated with the party receiving the call.

With reference to the ringing current and ringback tone mentioned above, because of the common control feature of the transmission bridge circuit, these functions are not dedicated to either side of the transmission bridge circuit but depend on which side of the transmission bridge circuit is connected to the called party and which side is connected to the calling party.

Associated with each transmission bridge circuit TC No. 1 to TC No. 0 is a transfer relay R1 to R0, part of the transfer relay circuit 109. Although shown in FIG. 1A as being separated out from the transmission bridge circuits into a circuit of their own, 109, the individual relays R1 to R0 are really part of their associated transmission bridge circuits and are intimately tied to what ever function that transmission bridge circuit is being used for. These relays are shown as a separate circuit 109 in order to illustrate commonality of function therebetween. This commonality of function resides in the ability of each relay to connect together two lines on the same crossbar switch, thereby completing an intra-switch call, or to connect together two lines on different crossbar switches, thereby completing an inter-switch call. This will be described further hereinafter.

At this point it should be pointed out that whereas each subscriber is connected to the line circuit by the two wires of his instrument, from the line circuit through the crossbar switch to the transfer relays a total of five wires may be used for each connection. For example, if the system were a two wire switching system, then two of the wires could be used for bidirectional tip and ring; and each of the remaining wires could be used for sleeve, control, marking, monitoring, or any other desired function. If the system were a four wire system, then two of the wires could be used for unidirection transmission tip and ring, two more for unidirectional reception tip and ring, and the fifth wire could be used for any other function as needed. Thus, though illustrated by a single path, each horizontal and each vertical comprises in reality 5 wires, and each transfer relay actually makes 5 transfers, one for each wire.

As shown in FIGS. 1A and 1B, the common of each transfer relay is connected to a transmission bridge circuit and a vertical of its associated crossbar switch. The make contact of the transfer relay is connected to another vertical of the same crossbar switch, while the break contact of the transfer relay is connected to a vertical of the other crossbar switch. Thus, transfer relay R1 has its common connected to vertical V2 of crossbar switch a, its make contact connected to vertical V1 of crossbar switch A, and its break contact connected to vertical V2 of crossbar switch B. Transfer relay R6 has its common connected to vertical V1 of crossbar switch B, its make contact connected to vertical V2 of crossbar switch B, and its break contact connected to vertical V1 of crossbar switch A. Similarly, transfer relay R2 has its common connected to vertical V4 of crossbar switch A, its make contact connected to vertical V3 of crossbar switch A, and its break contact connected to vertical V4 of crossbar switch B; while transfer relay R7 has its common connected to vertical V3 of crossbar switch B, its make contact connected to vertical V4 of crossbar switch B, and its break contact connected to vertical V3 of crossbar switch A. All other transfer relays are similarly connected.

Thus, the common of each transfer relay, via its associated transmission bridge can connect its associated vertical to a vertical of the same crossbar switch for an intra-switch call, or to a vertical of the other crossbar switch for an inter-switch call via its associated transmission bridge.

When the common control circuit 111 selects a transmission bridge circuit to serve a call, it also selects the verticals and transfer relay that will serve that call.

It will be noted that each transfer relay associated with one crossbar switch has a cooperating transfer relay associated with the other crossbar switch. Thus, transfer relays R1 and R6 are cooperating transfer relays; transfer relays R2 and R7 are cooperating transfer relays; transfer relays R3 and R8 are cooperating transfer relays, etc.

It will also be noted that the break contact of each transfer relay is connected to the make contact of its cooperating transfer relay and to the vertical associated with that make contact.

As cooperating transfer relays, the transfer relays normally operate together to establish the same type of connection. When one transfer relay is connecting together two verticals for an intra-switch call, the cooperating transfer relay is also connecting together two verticals for an intra-switch call; and conversely, when one transfer relay is connecting together two verticals for an inter-switch call, the cooperating transfer relay is also connecting together two verticals for an inter-switch call. The cooperating operation is shown in FIG. 1A where transfer relays R5 and R0 are positioned for inter-switch calls, transfer relays R4 and R9 are positioned for intra-switch calls, transfer relays R3 and R8 are positioned for inter-switch calls, and transfer relays R1 and R6 are positioned for intra-switch calls. Transfer relays R2 and R7, though cooperating transfer relays, are not positioned to establish either an inter- or an intra-switch call, but are positioned to establish a conference call, which call will be described below. It is to be noted at this point that each pair of cooperating transfer relays is not dedicated to perform only the type of call illustrated in FIG. 1A, but each pair of transfer relays can perform intra-switch connections, inter-switch connections, and conference connections.

In a normal two-party call, this cooperating operation of the transfer relays is the only form of dedication in the system. If one transfer relay is used for an intra-switch call, then the cooperating transfer relay must also be positioned for an intra-switch call. Also, if one transfer relay is used for an inter-switch call, the cooperating transfer relay must also be used for an inter-switch call. However, this dedication of the cooperating transfer relay lasts only during the holding time of the first transfer relay. Once the first transfer relay goes free, either transfer relay may then be used in either an intra- or inter-switch call, and for the holding time of this new call, the cooperating transfer relay is again dedicated. The transfer relay itself is not dedicated exclusively for either intra-switching or inter-switching. Thus, the transmission bridge circuit with which the transfer relay is associated is also a non-dedicated circuit and at any time may be busy, idle, or idle but temporarily dedicated because of the cooperating transfer relay. In addition, the dedication of the cooperating transfer relay during the holding time of a call has no effect on the other transfer relays in the system which are free to engage in intra- or inter-switching at any time.

Naturally, for efficiency of operation, it is best for the system to route calls over those relays and transmission circuits that are already dedicated to that type of call rather than utilize a free circuit. For example, assume that all of the transfer relays R1 to R0 are free when a subscriber on crossbar switch A wishes to call another subscriber on crossbar switch A. The control circuit 111 may assign transmission bridge circuit TC No. 1 and verticals V1 and V2 to handle the call and it will therefore operate transfer relay R1 to the intra-switch position as shown in FIG. 1A. If during this call a subscriber on crossbar switch B wishes to call another subscriber on crossbar switch B, control circuit 111 could assign any of the transmission bridge circuits and verticals of crossbar switch B to handle the call, as for example transmission bridge circuit TC No. 9 and vertical V7 and V8 of crossbar switch B along with associated transfer relay R9. But this procedure would tie up four transfer relays, transfer relay R1, cooperating transfer relay R6, transfer relay R9 and cooperating transfer relay R4. A better procedure in handling this second call would be to assign the call to transmission bridge circuit TC No. 6 and verticals V1 and V2 of crossbar swtich B and thus use only transfer relay R6 which is already dedicated to an intra-switch call. This would leave all other transfer relays, including R9 and R4 to handle any other call, whether intra or inter.

The same situation would be true for an inter-switch call. Assume a subscriber on crossbar switch A wants to call a subscriber on crossbar switch B. Control circuit 111 may assign transmission bridge circuit TC No. 5, vertical V0 of crossbar switch A and vertical V0 of crossbar switch B to handle the call. Common control circuit 111 would therefore position transfer relay R5 to the inter-switch position as shown in FIG. A1. If now another subscriber on crossbar switch B wishes to call a subscriber on crossbar switch A, rather than use any other transfer relay, the common control circuit 111 would route the call over transmission bridge circuit TC No. 0, vertical V9 of crossbar switch B and vertical V9 of crossbar switch A, thus utilizing transfer relay R0 which is already dedicated to an inter-switch call. All other transfer relays could thus remain free.

If, instead of the above second call being made from a subscriber on crossbar switch B to a subscriber on crossbar switch A, the call were made by the subscriber on crossbar switch A to the subscriber on crossbar switch B, the common control circuit 111 would still choose the same route, even though transmission bridge circuit TC No. 0 is not associated with crossbar switch A but is instead associated with crossbar switch B; since, as pointed out above, the transmission bridge circuit TC No. 0 is controlled by the common control circuit 111 over connecting path C50 and not by its associated crossbar switch B. Thus, the circuit can be used to connect a calling party on crossbar switch A to a called party on crossbar switch B.

Because of its common control feature, the transmission bridge circuit provides the system with full flexibility in being able to make calls in either direction.

If during a call, a second call were placed over the dedicated cooperating transfer relay, and while this call remained in progress, the first call terminated, then the transfer relay handling the first call would remain dedicated to the type of call it was handling until the second call terminated. If on the other hand no call were placed over the dedicated cooperating transfer relay, then when the original call terminated, both relays would be free to engage in subsequent calls, whether those subsequent calls were inter- or intra-switch calls.

Thus, it can be seen that the ten transmission bridge circuits TC No. 1 to TC No. 0 can always handle the maximum traffic possible; either five intra-switch calls on crossbar switch A and five intra-switch calls on crossbar switch B, 10 inter-switch calls between crossbar switches A and B, or any combination of intra- and inter-switch calls up to the maximum of ten simultaneous calls. The only limitation to this maximization feature occurs when the transmission bridge circuits, either 105 or 107, associated with either crossbar switch A or B, are all occupied on intra-switch calls, and an inter-switch call is placed or when the transmission bridge circuits, either 105 or 107, are occupied with inter-switch calls, and an intra-switch call is placed.

As pointed out above, the entire system: horizontal magnets, vertical magnets, transfer bridge circuits, transfer relay circuits; all are controlled by the common control circuit 111. To effect this control, the common control circuit 111 contains line scanner equipment, dial or dual tone multifrequency digit registers, a link map, and a transfer circuit control, as well as controls for the crossbar switch magnets. Of primary importance is the memory function contained in the link map.

The memory function in the common control circuit 111 know which lines are connected to which verticals and the connections between verticals via the transfer relay circuitry in intra-switch connections, inter-switch connections, or conference connections. This information would be stored in the link map as it is generated. Since the common control circuit 111 initially makes these assignments it has no difficulty in memorizing what the assignments are. In making such assignments, to prolong the life of the equipment, the common control circuit would use a rotary hunting feature and other techniques standard in a telephone system which are necessary to average usage and save wear and tear on the equipment.

The determination as to what verticals and transfer relay are to be assigned to what call is based on the information which the common control circuit receives in its digit register. Before making such assignment, the common control circuit receives all the digits and stores them, and from the information thus received determines whether the call is an intra- or inter-switch call. After making such determination, the control circuit must consult the link map to determine what transmission bridge circuits are free, and what transfer relays are dedicated to either an intra- or inter-switch or switches call. Only then can the proper connection in the crossbar switch and transfer relay circuit be made. These connections would be the connection of the calling party's horizontal to a vertical, the connection of the associated transfer relay into an intra- or inter-switch configuration, and the connection of the associated vertical to the horizontal of the called party.

As an example of an intra-switch call on the operation of the present telephone switching system consider a call by a subscriber on line 01 to a subscriber on line 02. When the subscriber on line 01 goes off-hook line circuit L01 places the off-hook signal on path C01 whereby the line scanner equipment in the common control circuit 111 in its scanning operation, via paths C01–C40, detects this off-hook and registers this operation in memory. Over path C01 the common control circuit 111 provides dial tone to the line 01 in response thereto, over path C01, the subscriber dials the appropriate digits of the called party which are picked up pulse-by-pulse by the control circuit 111 in its scanning operation, which digits are routed into the digit register in common control circuit 111. Upon receipt of the first digit, the common control circuit causes dial tone to be removed. Upon receipt of all the digits, the common control circuit 111 analyzes the same, determining that the call is, in the present example, an intra-switch call.

For the purpose of this example, let it be assumed that all the transmission bridge circuits shown in FIG. 1A are busy except transmission bridge circuits TC No. 3, TC No. 8, and TC No. 4, and that transmission bridge circuit TC No. 9 is busy on an intra-switch call for crossbar switch B through the make contacts of transfer relay R9. The common control circuit 111 will consult its link map, recognize this configuration, maintain transfer relay circuit R4 operated over path C54 (rather than operating transfer relay R3) and cause the control 115 for the magnets of crossbar switch A to effect the following: (1) operation of horizontal magnets HA and H1, (2) operation of vertical magnet V8 whereby line 01 is connected to vertical V8, (3) release of horizontal magnets HA and H1, (4) operation of horizontal magnets HA and H2, (5) operation of vertical magnet V7 whereby line 02 is connected to vertical V7, and (6) release of horizontal magnets HA and H2. Since transfer relay R4 is already maintained in an intra-switch configuration by a signal over path C54 both verticals and lines connected thereto are automatically connected to transmission bridge circuit TC No. 4. Over path C44, the common control circuit 111 will cause the calling and called ends to be split in TC No. 4 and will cause ringing current to be sent out through transmission bridge circuit TC No. 4 and over vertical V7 to the subscriber on line 02, and ringback tone to be sent out through transmission bridge TC No. 4 and over vertical V8 to the subscriber on line 01. When the subscriber on line 02 lifts his handset, the common control circuit 111 will detect this action through line circuit L02 over path C02 and will cause the ringing current and ringback tone to terminate, making conversation possible by removing the split.

If, in the example described above, transmission circuit TC No. 4 were busy and transmission circuit TC No. 3 and TC No. 8 were still free, then the common control circuit 111 would energize transfer relays R3 and R8 over paths C53 and C58 respectively, switching them to their intra-switch configuration. The common control circuit 111 would then cause lines 01 and 02 to be connected to verticals V6 and V5 respectively for example and the ringing current and ringback tone would go out over transmission bridge circuit TC No. 3. All other operations would remain the same.

As an example of an intra-switch call, consider a call by a subscriber on line 04 to a subscriber on line 21. When the subscriber on line 04 goes off-hook the line scanner equipment in the common control circuit 111 in its scanning operation detects this off-hook operation via line circuit L04 and path 604, and this operation in memory. Over path C04, the common control circuit 111 assigns dial tone to the line 04, and in response thereto, over path C04 the subscriber dials the appropriate digits of the called party which are picked up pulse-by-pulse by the common control circuit 111 in its scanning operation, which digits are routed to digit register in common control circuit 111. Upon receipt of the first digit, the common control circuit causes dial tone to be removed. Upon receipt of all the digits, the common control circuit 111 analyses the same and determines that the call is, in this example, in inter-switch call.

For the purpose of this example, let it be assumed that all the transmission bridge circuits shown in FIG. 1A are busy except transmission bridge circuits TC No. 8, TC No. 4, and TC No. 9, and that transmission bridge circuit TC No. 3 is busy on an inter-switch call through the break contacts of relay R3. The common control circuit 111 will consult its link map, recognize the configuration, allow transfer relay R8 to remain in its non-operated condition (rather than de-energizing transfer relay R4 or R9) and cause the control 115 for the magnets of crossbar switch A to effect the following: (1) operation of horizontal magnets HA and H4, (2) operation of vertical magnet V5 whereby line 04 is connected to vertical V5, and (3) release of horizontal magnets HA and H4; while the control 117 for the magnets of crossbar switch B effects the following: (1) operation of horizontal magnets HA and H1, (2) operation of vertical magnet V5 whereby line 21 is connected to vertical V5, and (3) release of horizontal magnets HA and H1. Since transfer relay R8 is already in an inter-switch configuration, no signal over path C58 need be sent to the transfer relay, and both verticals and the lines connected thereon are automatically connected to the transmission bridge circuit TC No. 8. Over path C48, the common control circuit 111 will cause TC No. 8 to split the connection and will cause ringing current to be sent out through transmission bridge circuit TC No. 8 and over vertical V5 of crossbar switch B to the subscriber on line 21, and ringback tone to be sent out through transmission bridge circuit TC No. 8 and over vertical V5 of crossbar switch A to the subscriber on line 04. When the subscriber on line 21 lifts his handset, the common control circuit 111 will detect this action through line circuit L21 over path C21 and via path C48 will cause the ringing current and ringback tone to terminate, and remove the split, making conversation possible.

If, in the example described above, transmission circuit TC No. 8 were busy and transmission circuits TC No. 4 and TC No. 9 were still free, then common control circuit 111 would de-energize transfer relays R4 and R9 over paths C54 and C59 thus switching them to their inter-switch configuration. The common control circuit 111 would then cause lines 04 and 21 to be connected to verticals V8 of their respective switches and the ringing current and ringback tone would go out over transmission bridge circuit TC No. 4. As before, all other operations would remain the same.

During the normal operation of the above described system, calls will be initiated and terminated and the holding times for each call will be different. The following situation may present itself.

Assume that transfer relays R1, R6, R4, and R9 are engaged in handling intra-switch calls, as shown in FIG. 1A, and that all other transfer relays are also engaged in call handling. Assume further that the call over transfer relay R1 terminates and that the call over transfer relay R9 also terminates. As a final assumption, assume that a subscriber on line 10 of crossbar switch A places a call to a subscriber on line 30 of crossbar switch B.

The situation as it now presents itself is that all of the transfer relays are engaged in call handling except transfer relays R1 and R9, but that these two transfer relays are not cooperating relays. Thus, even though these two transfer relays are not handling any calls, because they are non-cooperating, and because they are both dedicated to intra-switch calls, it would appear that the inter-switch call placed by the subscriber on line 10 cannot be completed. However, the ability of the system to complete the call is an example of its flexibility.

As before, when the subscriber on line 10 goes off-hook, through line circuit L10 and over path C10, his action is detected by the line scanner, he receives dial tone, and he subsequently enters the digits of the called party into the digit register of the common control circuit 111. The common control circuit 111, analyzes the digits and determines that the call is an inter-switch call. Consulting its link map the common control circuit 111 determines that there are no available inter-switch paths, but that there are two transfer relays R1 and R9 that are not engaged in handling calls, that these transfer relays are not cooperating relays.

At this point, the common control circuit 111 will make a choice. Assume that the call over transfer relay R6 was placed by the subscriber on line 39 over vertical V1 to the subscriber on line 40 over vertical V2. At this point, the common control circuit 111 will cause the control 117 to effect the following: (1) operation of horizontal magnets HB and H9, (2) operation of vertical magnets V7 whereby vertical V7 of the crossbar switch B is placed across line 39 in parallel with vertical V1, and (3) release of horizontal magnets HB and H9; and will also cause the control 117 to (1) operate horizontal magnets HB and H0, (2) operate vertical magnet V8 whereby vertical V8 is placed across line 40 in parallel with vertical V2, and (3) release horizontal magnets HB and H0. Transmission bridge circuit TC No. 9 will be seized by the common control circuit 111 for an intra-switch call. Once the connection between lines 39 and 40 is complete over transfer relay R9, the common control circuit 111 will cause control 117 to de-energize vertical magnets V1 and V2 and the connection between line 39 and vertical V1 and the connection between line 40 and vertical V2 will be released.

The link map is common control circuit 111 will record that transfer relay R9 is now engaged in call handling and that transfer relay R6 is no longer engaged in call handling. The common control circuit 111 will seize transmission bridge circuit TC No. 1 over path C41, and at the same time, over paths C51 and C46, will cause transfer relays R1 and R6 respectively to transfer to an inter-switch configuration.

The common control circuit 111 will now cause control 115 to effect the following: (1) operation of horizontal magnets HA and H0, (2) operation of vertical magnet V2 whereby line 10 is connected to vertical V2 of crossbar switch A, and (3) release of horizontal magnets HA and H0; and will cause control 117 to affect the following (1) operation of horizontal magnets HA and H0, (2) operation of vertical magnet V2 of crossbar switch B, whereby line 30 is connected to vertical V2 of crossbar switch B, and (3) release of horizontal magnets HA and H0. Over path C41, the common control circuit 111 will cause ringing current and ringback tone to be sent out through transmission bridge circuit TC No. 1 to lines 30 and line 10 respectively. When the subscriber on line 30 goes off-hook, ringing current ringback tone will terminate and the conversation can proceed.

It is to be noted that instead of transferring the original call on transfer relay R6 over to transfer relay R9, the common control circuit might just as easily have chosen the transfer the call on transfer relay R4 over to transfer relay R1. This would have caused both transfer relay R4 and R9 to be longer engaged in call handling and the call from the subscriber on line 10 to the subscriber on line 30 would then have been placed over transfer relay R4, instead of over transfer relay R1 as previously described.

Conversely if two non-cooperating transfer relays are dedicated to inter-switch calls while all other transfer relays are engaged in call handling, and a subscriber places an intra-switch call, the common control circuit will transfer an inter-switch call from a cooperating transfer relay to a transfer relay that is not engaged in call handling and will cause the transfer relay now no longer engaged in call handling to complete the intra-switch call.

Assume, for example, that transfer relays R3, R8, R5, and R0 are engaged in handling inter-switch calls as shown in FIG. 1A, and that all other transfer relays are also engaged in call handling. Assume further that the call on transfer relay R8 terminates and that the call on transfer relay R5 also terminates. As a final assumption, assume that a subscriber on line 32 places a call to a subscriber on line 33.

The situation as it now presents itself is that all of the transfer relays are engaged in call handling except transfer relays R8 and R5, but that these two transfer relays are not cooperating relays.

As before, when the subscriber on line 32 goes off-hook, through line circuit L32 and over path C32 his action is detected by the line scanner, he receives dial tone, and he subsequently enters the digits of the called party into the digit register of the common control circuit 111. The common control circuit 111 analyzes the digits and determines that the call is an intra-switch call. Consulting its link map the common control circuit 111 determines that there are no available intra-switch paths, but that there are two transfer relays, R8 and R5, that are not engaged in handling calls, but that these transfer relays were not cooperating relays.

Again the common control circuit 111 must make a choice. It can either switch the call on transfer relay R3 over to transfer relay R5, or it can switch the call on transfer relay R0, over to transfer relay R8. Assume that the former choice is made.

If we assume that the call over transfer relay R3 was made by a subscriber on line 16 over vertical V6 of crossbar switch A to a subscriber on line 26 over vertical V6 of crossbar switch B, then the common control circuit 111 will cause the control 115 to effect the following: (1) operation of horizontal magnets HB and H6, (2) operation of vertical magnet V0 whereby vertical V0 of crossbar switch A is placed across line 16 in parallel with vertical V6, and (3) release of horizontal magnets HB and H6; and will also cause the control 117 to: (1) operate horizontal magnets HA and H6, (2) operate vertical magnet V0 whereby vertical V0 of crossbar switch B is placed across line 26 in parallel with vertical V6, and (3) release horizontal magnets HA and H6. Transmission bridge circuit TC No. 5 will be seized by the common control circuit 111 for an inter-switch call. Once the connection between lines 16 and 26 is complete over transfer relay R5, the common control 111 will cause controls 115 and 117 to de-energize vertical magnets V6 in both crossbar switch A and crossbar switch B respectively and the connection between verticals V6 and lines 16 and 26 will be released.

The link map in common control circuit 111 will record that transfer relay R5 is now engaged in call handling and that transfer relay R3 is no longer engaged in call handling. The common control circuit 111 will seize transmission bridge circuit TC No. 3 over path C43, and at the same time, over paths C53 and C58, will cause transfer relays R3 and R8 respectively to transfer to an intra-switch configuration.

The common control circuit 111 will now cause control 115 to effect the following: (1) operation of horizontal magnets HB and H2, (2) operation of vertical magnet V5 whereby line 32 is connected to vertical V5, (3) release of horizontal magnets HB and H2, (4) operation of horizontal magnets HB and H3, (5) operation of vertical magnet V6 whereby line 33 is connected to vertical V6, and (6) release of horizontal magnets HB and H3. Over path C48, the common control circuit 111 will cause ringing current and ringback tone to be sent out through transmission bridge circuits TC No. 8 to lines 33 and 32 respectively, and when the subscriber on line 33 goes off hook, the ringing current and ringback tone will terminate and the conversation can proceed.

As pointed out above, in transferring the call on transfer relay R3 over to transfer relay R5, the common control circuit 111 made a choice. It might just as easily have transferred the call on transfer relay R0 over to transfer relay R8. This would have caused both transfer relay R5 and R0 to be no longer engaged in call handling and the call from the subscriber on line 32 to the subscriber on line 33 would then have been placed over transfer relay R0, instead of over transfer relay R8 as previously described.

Thus it can be seen that the aforedescribed system provides the utmost in flexibility and usage and the maxium in traffic capacity.

While the procedure for rearranging the traffic pattern does promote maximum traffic capacity, the demand for action by subscribers could be of such frequency that the registers would be filled to capacity with information and transmission paths would not be available. To avoid such congestion in the registers, rather than handling demands for action on a first-come, first-serve basis, a feature of the present system would allow a release signal received by the common control circuit 111 to take precedence over completing a connection between subscribers. Thus, if during the period when the control circuit is in the process of making a connection it receives a release signal from one of the crossbar switches, it will process that release signal first, then return to the task of completing the connection.

This procedure helps to improve the traffic pattern. In fact, but for this priority feature, many calls might not be completed, but with this priority release feature, circuits that are thus released can be used again. There would be no rearrangement of the traffic pattern, a feature that does take time, since transmission paths may go free before rearrangement would be needed.

Although the cooperating transfer relays R1 and R6, R2 and R7, R3 and R8, etc., as described above, operate together in a system not providing conference calls, a single transfer relay in place of each cooperating pair of transfer relays could be used, the single transfer relay providing the same contacts that the pair of transfer relays provide. This single transfer relay, since it must serve two transmission bridge circuits, of necissity would have to be a separate component and not part of any particular transmission bridge circuit as described above. However, with two transfer relays, by controlling each transfer relay individually it is possible to have a three party conference. Such a three party conference is shown by the configuration of transfer relay R2 and R7 in FIG. 1A.

As shown in FIG. 1A, transfer relay R2 is in an inter-switch configuration, while transfer realy R7 is in an intra-switch configuration. Thus, vertrical V4 of crossbar switch A and verticals V3 and V4 of crossbar switch B are interconnected and the subscribers connected to the three verticals can converse with each other.

A conference signal detected by scanning of the line circuits, for example, could be used by the originator to initiate the conference call, the only limitation on the selection of conferees by the originator being that both conferees selected cannot be subscribers on the same switching matrix as the originator. If the above limitation is met, then from the information received, the common control circuit 111 over the appropriate path can control any two cooperate transfer relays to a configuration similar to that shown by transfer relay R2 and R7. This may require rearranging the traffic pattern as described above, but the procedure would be the same.

As an example of the above conference call, assume that a subscriber on line 15 first calls a subscriber on line 25. As before, his going off-hook would be detected by the line scanner in the common control circuit 111. Over path C15 and through line circuit L15 the subscriber would receive dial tone and he would enter the identifying digits of the subscriber on line 25 into the digit register. The digits would be analyzed by the common control circuit 111, a transmission bridge circuit would be assigned to the call, and the proper horizontal and vertical magnets energized.

For the present example, assume transmission bridge circuit TC No. 2 is free and that common control circuit 111 assigns it to the call. Over path C42 the transmission bridge circuit TC No. 2 would be seized, and over path C52 transfer relay R2 would be switched to an inter-switch configuration as shown in FIG. 1. At this time over path C57 transfer relay R7 would also be switched to an inter-switch configuration. The common control circuit 111 would cause ringing current and ringback tone to be sent out through transmission bridge circuit TC No. 2 to the subscribers on lines 25 and 15 respectively. When the subscriber on line 25 lifts his handset the tones would terminate and the conversation could proceed.

If at this time the subscriber on line 15 wishes to include in the conversation the subscriber on line 26, he would send to the common control circuit 111 a conference signal, which signal would be detected by the line scanner equipment, temporarily placing the subscriber on line 25 on hold. Through the line circuit L15 and over path C15 the subscriber on line 15 would receive dial tone and would enter the digits of the subscriber on line 26 into the digit register of common control circuit 111. The common control circuit 111, recognizing that this is a conference call, after analyzing the digits determining that this subscriber can be placed in the conference, would if necessary, rearrange the traffic pattern, seize transmission bridge circuit TC No. 7 over path C47, and over path C57 switch transfer relay R7, which was in an inter-switch configuration, into an intra-switch configuration. The proper horizontal and vertical magnets would be energized by control 117 and ringing current and ringback tone would be sent through transmission bridge circuit TC No. 7 to the subscribers on line 26 and 15 respectively. When the subscriber on line 26 lifts his handset the current and tone would terminate, the subscriber on line 25 would be reconnected into the conference and the conversation could proceed.

If the subscriber on line 26 did not answer his call, the subscriber on line 15, by initiating another conference signal which would be detected by the line scanner equipment in the common control, could drop the connection to line 26 and re-establish his connection with the subscriber on line 25.

Numerous other possible traffic patterns and conference calls are possible with the afore-described system, Substitution of different types of switches for the crossbar switch described, rearrangement of the relay contacts, and implementation of a different digit registration procedure may be devised by those skilled in the art without departing from the scope and spirit of the invention as defined by the appended claims.

What is claimed is:

1. In a telephone switching system, a first crossbar switch having at least a first and a second vertical path, a second crossbar switch having at least one pair of vertical paths, a first switching means for said first crossbar switch operable between a first and a second condition, said first switching means being operable in its first condition to connect said first vertical path to said second vertical path in said first crossbar switch, and being operable in its second condition to connect said second vertical path of the first crossbar switch to one of said pair of vertical paths in said second crossbar switch, and a second switching means for said second crossbar switch operable between a first and a second condition, said second switching means being operable in its first condition to connect said pair of vertical paths in said second crossbar switch to each other, and being operable in its second condition to connect one of said pair of vertical paths of said second crossbar switch to one of said vertical paths in said first crossbar switch.

2. A system as set forth in claim 1 in which one vertical path of said first crossbar switch is connected to each of said vertical paths in said second crossbar switch with said first switching means in its second condition and said second switching means simultaneously in its first condition.

3. A system as set forth in claim 1 in which said first vertical path of said first crossbar switch is connected to one of said vertical paths in said second crossbar switch with said second switch in its second condition, and said second vertical path of said first crossbar switch is connected to the other one of said vertical paths in said crossbar switch with said first switch simultaneously in its second condition.

4. A system as set forth in claim 1 in which said first and second vertical paths of said first crossbar switch are interconnected with said first switching means in its first condition, and said pair of vertical paths of said second crossbar switch are interconnected with said second switching means simultaneously in its first condition.

5. A system as set forth in claim 1 in which each connection completed by said first and second switch means between vertical paths of said crossbar switches includes at least one transmission bridge circuit.

6. In a telephone switching system: a common control means; a first switching means containing a plurality of horizontal means and a plurality of vertical means, each one of said plurality of horizontal means and each one of said plurality of vertical means being controlled by said common control means, said plurality of vertical means being divided into a first group of vertical means and a second group of vertical means; a second switching means containing a plurality of horizontal means and a plurality of vertical means, each one of said plurality of horizontal means and each one of said plurality of vertical means being controlled by said common control means, said plurality of vertical means being divided into a first group of vertical means and a second group of vertical means; a plurality of first line means, each one of said plurality of first line means connected through an individual line circuit means to one of said plurality of horizontal means contained in said first switching means, each individual line circuit means being controlled by said common control means; a plurality of second line means, each one of said plurality of second line means connected through an individual line circuit means to one of said plurality of horizontal means contained in said second switching means, each individual line circuit means being controlled by said common control means; a plurality of first transmission bridge means, each one of said plurality of first transmission bridge means controlled by said common control means and connected to vertical means in said first group of vertical means contained in said first switching means; a plurality of second transmission bridge means, each one of said pllurality of second transmission bridge means controlled by said common control means and connected to vertical means in said first group of vertical means contained in said second switching means; a plurality of first transfer relay means, each of said plurality of first transfer relay means having a first contact means connected to one of said plurality of vertical means in said second group of vertical means contained in said first switching means, a second contact means in said second group of vertical means contained in said second switching means, and a third contact means connected through one of said plurality of first transmission bridge means to one of said plurality of vertical means in said first group of vertical means in said first switching means, said third contact means cooperatiing with said first contact means to connect two lines on said first switching means, said third contact means cooperating with said second contact means to connect a line on said first switching means with a line on said second switching means; a plurality of second transfer relay means, each of said plurality of second transfer relay means having a first contact means connected to one of said plurality of vertical means in said second group of vertical means contained in said second switching means, a second contact means connected to one of said plurality of vertical means in said second group of vertical means contained in said first switching means, and a third contact means connected through one of said plurality of second transmission bridge means to one of said plurality of vertical means in said first group of vertical means to said second switching means; said third contact means cooperating with said first contact means to connect two lines on said second switching means, said third contact means cooperating with said second contact means to connect a line on said second switching means with a line on said first switching means; each one of said plurality of first transfer relay means cooperating with one of said plurality of second transfer relay means with the first contact means of each one of said pair of cooperating transfer relay means being connected to the second contact means of the other one of said pair of cooperating transfer relay means; said common control means controlling the operation of each one of said transfer relays in said pair of cooperating relays to maximize the traffic handling capability of said system.

* * * * *